United States Patent [19]

El-Antably et al.

[11] Patent Number: 4,740,738
[45] Date of Patent: Apr. 26, 1988

[54] RELUCTANCE MOTOR CONTROL SYSTEM AND METHOD

[75] Inventors: Ahmed M. El-Antably, Pittsburgh; Jacob Zubek, New Kensington, both of Pa.

[73] Assignee: Westinghouse Electric Corp., Pittsburgh, Pa.

[21] Appl. No.: 908,417

[22] Filed: Sep. 17, 1986

[51] Int. Cl.$^4$ ............................................. H02P 5/40
[52] U.S. Cl. ..................................... 318/701; 318/723
[58] Field of Search .......................... 318/701, 721–723

[56] References Cited

U.S. PATENT DOCUMENTS 3,863,120 11/1975 Rettig .
4,051,419 9/1977 Takahashi ........................... 318/721
4,338,559 7/1982 Blaschke et al. ..................... 318/805
4,500,824 5/1984 Miller .

OTHER PUBLICATIONS

Dewan et al, *Power Semiconductor Drives*, John Wiley & Sons, 1984, p. 299, pp. 314–317.
IEEE Transactions, vol. IAW No. 5, Sep.–Oct. 1974, pp. 652–656, "Synchronous and Reluctance Motors in Position Servo Loops", Otto Krauer.
A. M. El-Antably, "Steady State Performance Characteristics of Linear Reluctance Motors", IEEE Transactions/Magnetics vol. MAGIS, No. 6, Nov. 1979, pp. 1440–1442.
Electrical Review, Mar. 22, 1968, "Synchronous Reluctance Motors", P. B. Greenwood, pp. 432–434.
"Closed–Loop Microprocessor Control System Variable Reluctance Motor", P. M. Chappell, IEEE Proceedings, vol. 131, P&B No. 2, Mar. 1984, pp. 51–60.
"Theory and Performance of Polyphase Reluctance Machines", J. Lawrence and L. A. Agu, Proc. IEEE, vol. 111, No. 8, Aug. 1964, pp. 1435–1445.
"Developments in the Performance and Theory of Segmental–Rotor Reluctance Motors", P. J. Lawrence and S. K. Gupta, Proc. IEEE, vol. 114, No. 5, May 1967, pp. 645–653.

*Primary Examiner*—David Smith, Jr.
*Attorney, Agent, or Firm*—C. M. Lorin

[57] ABSTRACT

A reluctance motor control system is stabilized by a load angle feedback control loop provided by a computation of the load angle from sensed voltage and current on the terminals of the motor with the assist of a derived frequency signal. The motor is operated at most efficient load angle in motoring or braking, while the motor voltage is being controlled so as to maintain the desired load angle as the speed and/or load vary.

7 Claims, 5 Drawing Sheets

RELUCTANCE MOTOR CONTROL SYSTEM AND METHOD

BACKGROUND OF THE INVENTION

The present invention relates to synchronous reluctance motor drive control.

The synchronous reluctance motor has been recognized as the simplest form of polyphase synchronous motor (see "Synchronous Reluctance Motors" by P. B. Greenwood in Electrical Review, Mar. 22, 1968, pp. 432–434; see also P. J. Lawrenson and L. A. Agu "Theory and Performance of Polyphase Reluctance Machines" in Proceedings IEEE 1964 III (8), p. 1435).

Reluctance motors have simple and robust rotors which run at synchronous speed. They, however, have no starting torque and, when they are excited from the mains, it was found necessary to include a squirrel cage in the rotor to allow starting on line. In order to include a squirrel cage in the rotor it is necessary to change the optimum rotor geometry so as to allow sufficient room for the conducting material of the cage bars. This has resulted in degrading the synchronous performance of reluctance motors and increasing the cost of constructing the motor. The synchronous, synchronizing, asynchronous and starting performance characteristics of a reluctance motor (fed from the mains) depend upon the rotor design. Therefore, the design of a reluctance motor (fed from the mains) is a delicate compromise between conflicting requirements imposed on the rotor geometry to achieve an acceptable overall performance. This has been considered a drawback of reluctance motors.

The reluctance motor will develop small oscillations around the synchronous speed when excited from a variable frequency source (e.g., inverter), unless using feedback control. It can operate in an open loop up to a load angle δ around 45°. It was found, however, that when a reluctance motor is excited from a variable frequency source and feedback control is utilized for stabilization, there is no need for cage bars. This was found to improve the efficiency-power factor product and to simplify significantly the rotor construction of the reluctance motor. Cageless reluctance motors have been built and tested with an appreciable improvement in performance and with reduction in the cost. The motor starts at zero frequency and the frequency is increased up to rated speed as the motor remains synchronized by feedback control. This has the important consequence of eliminating the use of cage bars in the rotor, the motor starting smoothly from zero speed. Furthermore, smooth starting of the motor eliminates the inrush of current when starting with a motor fed from the mains. This simplifies the control circuitry and reduces the size of the inverter. It is also highly desirable since there is no disturbance caused to the common grid. Furthermore, the elimination of cage bars eliminates what is a main drawback in the design of a reluctance motor.

Also, more efficient motors are being designed today. Cageless reluctance motors with a better efficiency (due to reduced losses) are superior because of higher power factor and larger output power than conventional reluctance motors. When the efficiency-power factor product is appreciably improved, since this product is inversely proportion to the inverter size, the inverter size and cost are consequently reduced. In conclusion, a cageless reluctance motor has better efficiency, power factor, starting performance, lower cost, and stable operation due to feedback control.

It has been shown that maximum efficiency, output power and power factor occur at a load angle between 45° and 60°, these angles lying in the unstable operating region of the reluctance motor, therefore requiring feedback control for stable and efficient operating. See: "Steady-State Performance Characteristics Of Linear Reluctance Motors" by A. M. El-Antably, J. D. Edwards, G. Williams, P. Lindon and P. D. Luke in Magnetics, Vol. 15, No. 6, November 1979, IEEE. As a result of this rapid advancement in solid-state variable frequency sources, and due to the new developments (cageless rotors and feedback control), it is now possible to design reluctance motors which are comparable in size to, and of lower cost than, induction motors of the same rating. The distinct advantages of cageless reluctance motors are that they are cheaper than induction motors of comparable size, and more suitable for variable-speed drives. The reluctance motor has become a serious candidate to replace the induction motor for variable-speed drive applications.

Feedback control permits a stable operation of the reluctance machine at load angles greater than 45° at which motor torque, power factor and efficiency are maximum. Feedback control also results in the elimination of the cage bars from the rotor, which improves efficiency and reduces cost. The present invention aims at a feedback control strategy for reluctance motors to optimize its performance and simplify its control.

The control strategy according to the present invention allows to operate a cageless reluctance motor as an energy efficient motor by control depending only upon measuring the terminal voltages and currents. Thus, there is no need for transducers to be mounted on the rotor shaft. This reduces cost and is advantageous in industrial applications when there is no access to the shaft. This feature combines with the fact that a reluctance motor is easier to control than an induction motor, thus, more suitable for variable speed motor drives.

SUMMARY OF THE INVENTION

The invention resides in a reluctance motor control system including a voltage-controlled and frequency-controlled inverter for controlling a reluctance motor and using as control parameter an operative load angle, the operative load angle being known by computation from voltage and current signals sensed on the motor terminals and from a frequency control signal applied to the inverter, wherein the load angle is adjusted by comparing the operative load angle with a reference load angle.

The invention also resides in a reluctance motor control system according to the invention allowing speed adjustment under a selected load angle chosen for maximum efficiency at all motor loads, wherein a voltage control loop is provided responsive to speed error while selecting the voltage-to-frequency ratio that is necessary to maintain the selected load angle while the speed and/or load vary. Such control system is particularly suitable for a cageless reluctance motor, because it combines feedback loop stabilizing control with optimum operation of the reluctance motor i.e. high efficiency and power factor.

DESCRIPTION OF THE INVENTION

Figure 1:
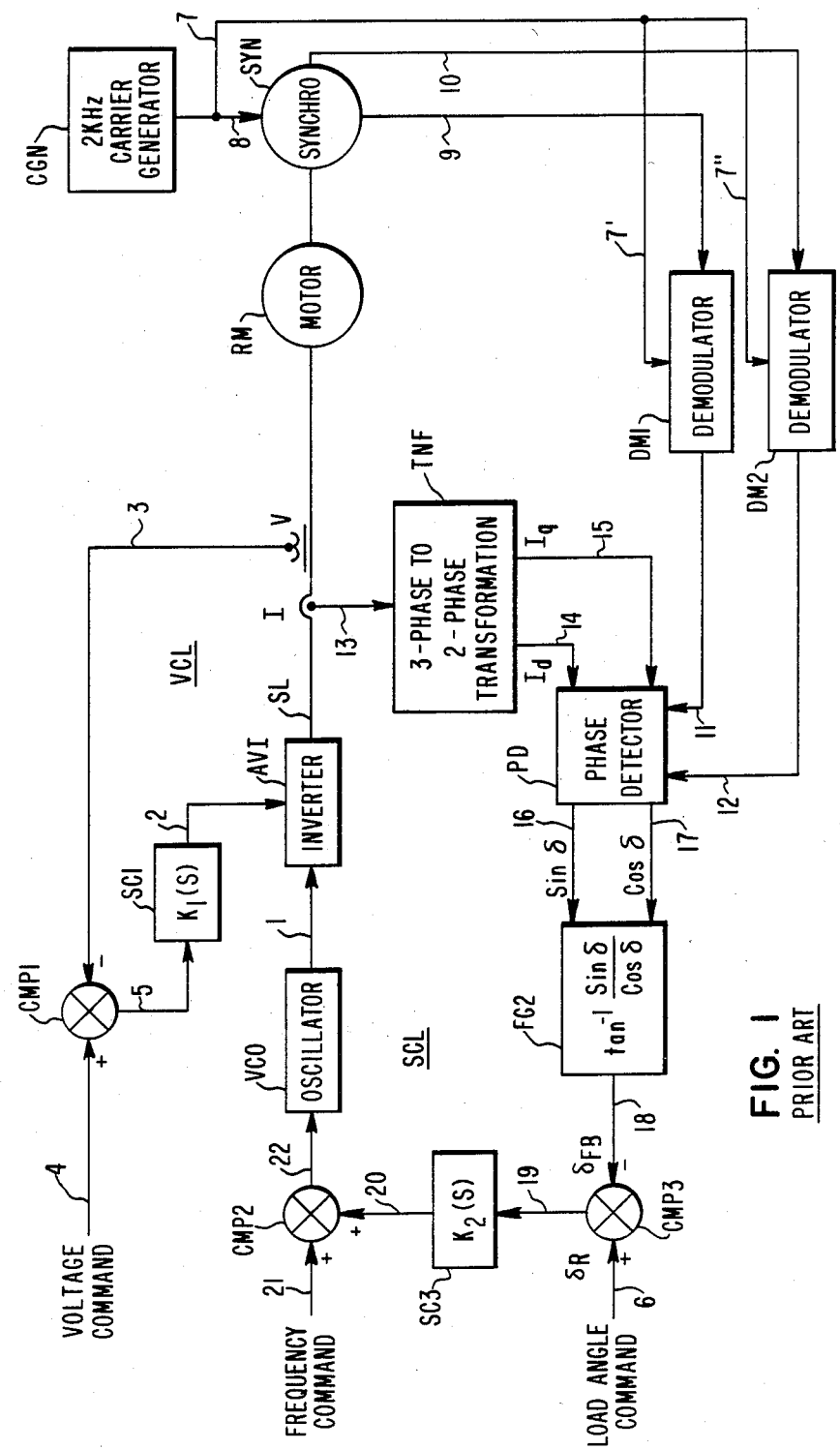
FIG. 1 shows a control system of the prior art providing load angle feedback control loop with the use of a position resolver for a cageless reluctance motor.

The reluctance motor, in general, has the same stator as an induction motor. The rotor, however, is built with salient poles, or segments, so as to provide axes of different magnetic reluctance, such that at synchronous speed the applied rotating flux axis always coincide with the direct axis of the rotor, except for a load angle when under torque. The load angle increases as the load increases. The reluctance motor has been improved by being built without a cage, and stabilized by using feedback control when excited from an inverter. Load angle feedback has been used to control the inverter frequency in a phase-locked loop. This approach is illustrated by the circuit of FIG. 1. A reluctance motor RM is supplied, over three phase lines SL, with AC current (I) under an AC voltage (V) from an inverter working as an adjustable voltage inverter. The inverter is controlled by line 1 providing frequency control (derived from a voltage-controlled oscillator VCO) and by line 2 providing voltage control.

Control of the voltage is obtained through a voltage control loop VCL including line 3 deriving a signal representative of the voltage V existing on lines SL and a comparator CMP1 responsive to line 3 and to line 4 (the latter applying a reference voltage signal). On line 5 of comparator CMP1 is derived an error signal converted by a scaling circuit SC1 into an appropriate control signal applied on line 2 to an adjustable voltage inverter, AVI.

Frequency control in the phase-locked loop includes a frequency command signal, or speed signal, applied on line 21 to a comparator CMP2 which carries over on line 22 a control signal for a voltage-controlled oscillator VCO. Load angle feedback control is obtained from line 19 through scaling circuit SC3 delivering on line 20 a compensating signal which intervenes with the speed signal of line 21, so as to attempt to meet the prescribed load angle ($\delta_R$ on line 6). The signal of line 19 is an error signal derived from comparator CMP3 comparing the actual load angle $\delta_{FB}$, derived on line 18 by feedback, with a load angle reference $\delta_R$ applied on line 6. The feedback load angle is obtained by (1) deriving on lines 14 and 15 direct and quadrature current (Id, Iq) representative signals, obtained by sensing the stator currents (lines 13), and by transforming such three-phase information into orthogonal components (Id, Iq) via a transformation circuit TNF; and (2) using a synchronous-resolver technique to identify the angle $\delta$ between rotor position and motor current. To this effect, the synchro SYN senses the rotor position and provides on lines 9 and 10 two rotor position characterizing signals. These signals are 2 KHz carrier modulated by the sine of the rotor position angle on line 9, and by the cosine of the rotor position angle, on line 10. The 2 KHz carrier signal is applied generator CGN by line 8 to the synchro SYN and, via lines 7' and 7'', to demodulators DM1, DM2, respectively, which eliminate the carrier frequency from the respective modulated signals of lines 9 and 10, thus, providing on lines 11 and 12 two orthogonal vector representative signals which are compared within dual channel phase detector PD, the phase currents being Id for line 14, and Iq for line 15. Accordingly, sin $\delta$ is obtained on line 16 and cos $\delta$ on line 17. Function generator FG2 responds to the signals of lines 16 and 17 to provide on line 18 the actual angle $\delta_{FB}$ as it exists in the motor.

Figure 2:
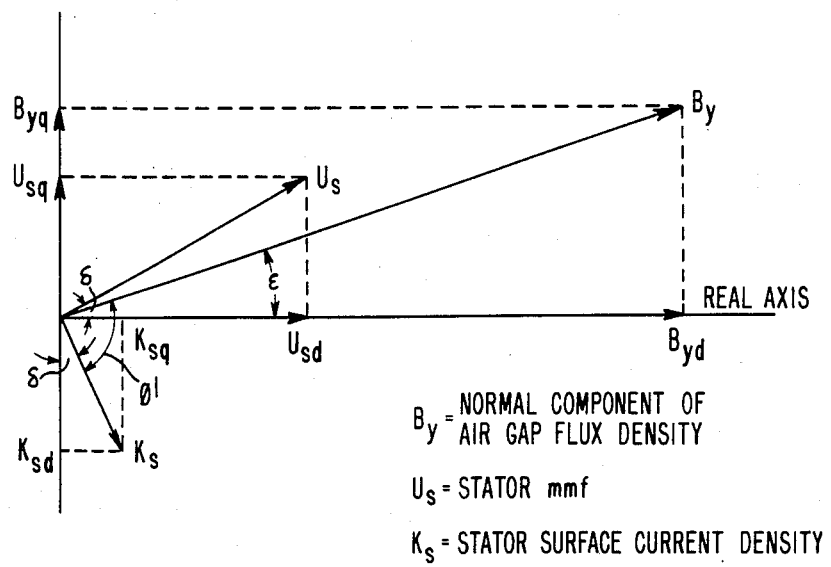
FIG. 2 is a space-phasor diagram of the air gap field components at the surface of a reluctance motor.

FIG. 2 illustrates with vectors the relationship between the normal air gap flux density By, the stator m.m.f. vector Us and the stator surface current density vector Ks. If the angle between vector By and vector Ks is $\phi'$, the load angle is $\delta$ between vector Ks and the quadrature axis, whereas $\delta$ is also to be found between vector Us and the direct axis. The space-phasor diagram of FIG. 2 shows the air gap field components at the stator surface of the reluctance motor. In the synchro-resolver, the stator is excited by the high-frequency carrier (2 KHz) and the in-phase and quadrature rotor controlling outputs thereof are demodulated to provide signals proportional to the sine and cosine of the rotor position, as generally known. Using the two-phase representation of the line currents, the phase detector provides signals proportional to sin $\delta$ and cos $\delta$.

It appears that, the circuit of FIG. 1 satisfies the requirement of stability thanks to the load angle feedback loop which is compensating for any discrepancy appearing on line 20 from comparator CMP3, which is the load angle error of line 19 scaled by circuit SC2. The running frequency is then defined by comparator CMP2 as the sum of the frequency command of line 21 and the scaled load angle error appearing on line 20. Obviously with such a system it is not possible to obtain both a load angle suitable for maximized efficiency, and a frequency as desired. There are three parameters, namely (voltage command on line 4, frequency command on line 21 and load angle command on line 6, which conflict with each other. Therefore, the system does not operate satisfactorily for all loads and all frequencies. Another, major drawback is the use of a synchro-resolver mounted on the shaft of the rotor. The present invention overcomes these two handicaps. Other advantages will appear from the description hereinafter of the circuit of FIG. 3 according to the present invention.

Figure 3:
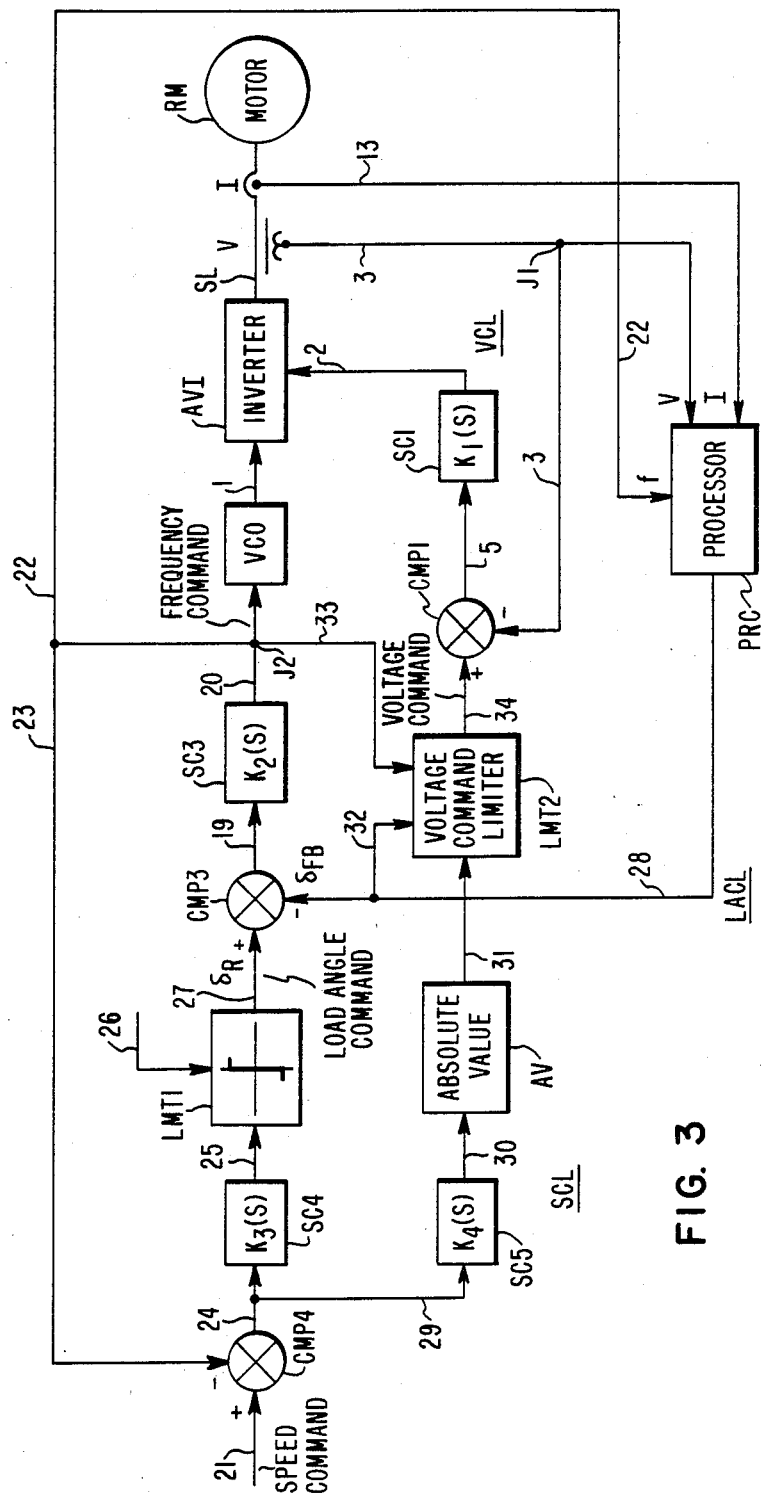
FIG. 3 shows the control system of the invention providing load angle feedback control loop by computation from the voltage and current terminals, and a frequency signal derived within the control system.

Feedback control according to FIG. 3 will allow stable operation of the reluctance motor at load angles greater than 45°. Maximum torque, power factor and efficiency actually occur at load angles between 45° and 60°. Therefore, feedback control results in both a stable and an efficient operation at all operating loads. Another advantage is that there is no need for cage bars in the rotor, which results in reducing the losses, in improving the efficiency and reducing the motor cost. There is also no need for transducers to be attached to the shaft.

The present invention leads to an improved feedback control with all the afore-stated advantages being derived from it.

Referring to FIG. 3, the invention is based on the direct computation of the load angle $\delta_{FB}$, rather than sensing shaft position with a synchro and the associated use of a resolver. It is also based on the observation that speed, as a substrate for the synchro-resolver approach, need not be sensed. Since the reluctance motor is controlled so as to operate at synchronous speed, the motor speed is directly proportional to the voltage control signal applied to the VCO and in turn it is proportional to the inverter output frequency. Therefore, the control signal to the VCO provides directly an indication of motor speed. No tachometer is necessary.

Figure 4:
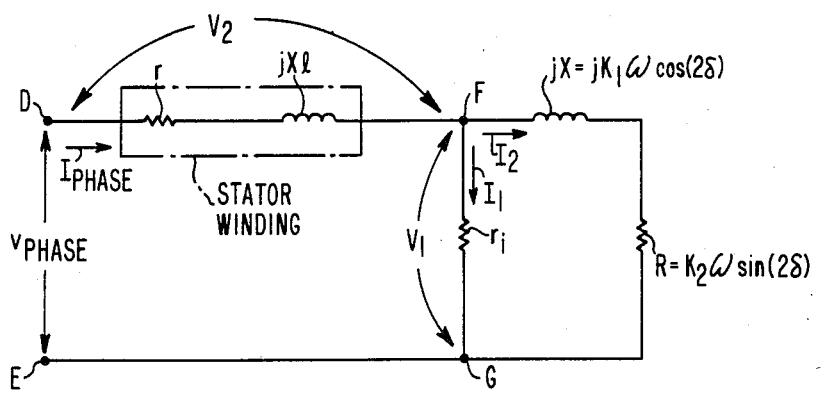
FIG. 4 is the equivalent circuit of a reluctance motor.

Referring now to FIG. 4, from the equivalent circuit of a reluctance motor it is apparent that the load angle $\delta_{FB}$ can be computed if the frequency of excitation, the line voltage V and the line current I are known. The phase voltage V (phase between D and E) defines a phase current I flowing in the stator winding (between D and F), the latter comprising a phase winding resistance r and a winding leakage inductance jX1. Thereafter, there are two branches between F and G. One branch is represented by a resistor $r_i$ which is the equivalent phase resistance representing iron, friction and windage losses. The other branch includes the rotor characteristics proper: an inductance symbolized by $jX = jK_1\omega \cos(2\delta)$ and $R = K_2\omega \sin(2\delta)$, where $K_1$ and $K_2$ are machine constants, and $\omega$ is the angular frequency. For the purpose of fully disclosing the equivalent circuit of FIG. 4, reference is made to "Developments in the Performance and Theory of Segmental-Rotor Reluctance Motors" in Proc. IEEE, Vol. 114, No. 5, May 1967 by P. J. Lawrenson and S. K. Gupta, pp. 645-653, which is hereby incorporated by reference.

The computation of the load angle $\delta_{FB}$ is simplified if resistor $r_i$ is large enough so that it can be neglected. Typically, neglecting $r_i$ introduces less than 4% error in computing the load angle.

For the purpose of illustration, one analog approach to load angle computation is provided by the equivalent circuit of FIG. 4. The stator winding between terminal D and junction F includes the stator resistance r and the inductance jX1. The rotor includes an inductance $jX = jK_1\omega \cos(2\delta)$ and a resistance $R = K_2\omega \sin(2\delta)$ in series within a branch extending between junctions F and G. The losses are symbolized by a resistor $r_i$ across F and G. The voltage is $V_2$ between D and F and $V_1$ across F and G, with a current $I_1$ in the $r_i$ branch and a current $I_2$ in the (jX, R) branch. In the equivalent circuit the parameters are as follows:

r = phase winding resistance
$X_1$ = winding leakage reactance
$r_i$ = equivalent phase resistance representing iron, friction, and windage losses
$\omega$ = angular frequency
$K_1$ = machine constant
$K_2$ = machine constant
$V_{phase}$ = phase voltage
$I_{phase}$ = line current $K_1$ and $K_2$ are given in: Proc. IEEE, Vol. 114, No. 5, pp. 645-653, May 1967 "Developments in the Performance and Theory of Segmental-Rotor Reluctance Motors" by P. J. Lawrenson and S. K. Gupta. For the purpose of this disclosure, the Lawrenson and Gupta paper is hereby incorporated by reference.

Considering the two-phase equivalent vectors $V_d$, $V_q$ and $I_d$, $I_q$, for the phase voltage and phase current, respectively, the average power per phase supplied to the motor is $P = |I| \cdot |V| \cos \phi = I_d V_d + I_q V_q$. Written another way, the average power is $P \sim |I|^2(R+r) + P_{ri}$, where $|I|^2 = I_d^2 + I_q^2$ and $P_{ri}$ = losses in the motor core, by friction and windage. The values of $P_{ri}$ are known in advance by measurement at the motor terminals over the operating speed range. These values are than programmed into the processor used for the computation of the load angle. This computation can be illustrated in an analog mode using a function generator circuit.

Then, the resistor R is known as:

$$R \sim \frac{P - P_{ri}}{|I|^2} - r$$

From the preceding equation, and from the formulation of $\sin 2_{FB}$ in the article by P. J. Lawrenson in Proceedings IEE, vol. III, No. 8, August, 1964, pp. 1435–1445, entitled "Theory and Performance of Polyphase Reluctance", it follows that:

$$\delta_{FB} \sim \tfrac{1}{2} \arcsin^{-1}\left(\frac{R}{2\pi f \cdot K_2}\right)$$

Where $K_2$ is a motor design constant.

Figure 5A:
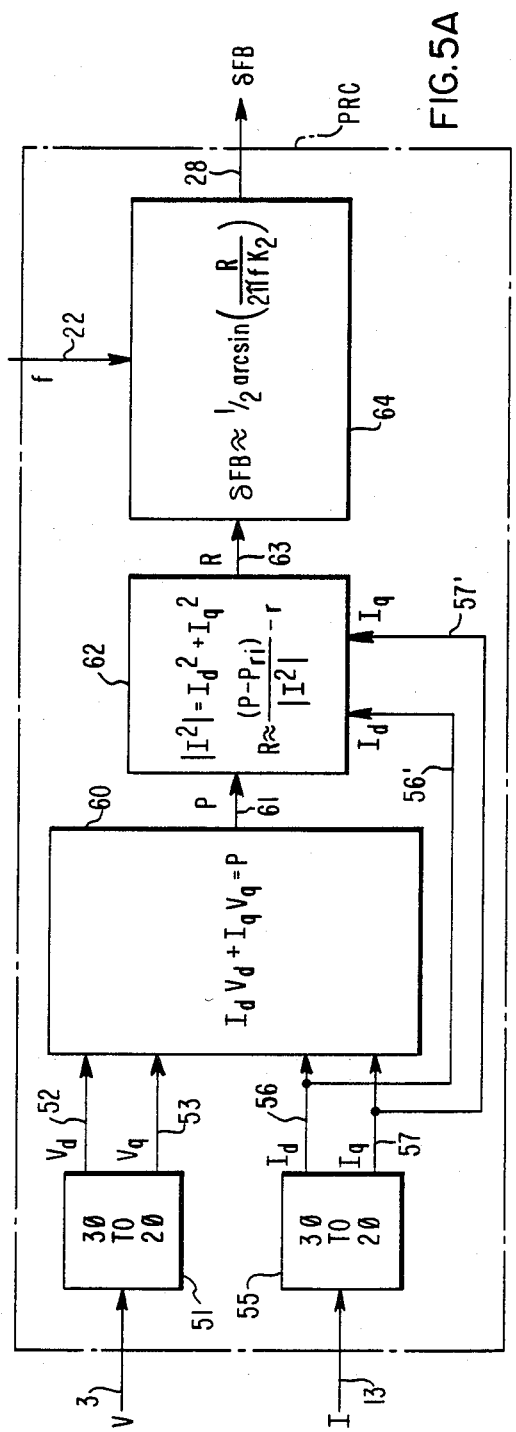
FIG. 5A is a block diagram illustrating the derivation of the load angle by the processor of FIG. 3.

FIG. 5A illustrates with a block diagram how the processor of FIG. 3 generates on line 28 a signal computed from the three parameters, V, I and f, supplied on lines 3, 13 and 22, respectively. From line 3 signals representing the three voltage terminals are derived. In transformation circuit 51 they are converted into a two-phase voltage representation, namely Vd on line 52 and Vq on line 53. Similarly, the current is sensed from the three motor terminals and the corresponding signals on lines 13 are also converted by a transformation circuit 55 into a two-phase current output on lines 56 for $I_d$ and 57 for $I_q$. Within block 60 is effected the computation of the power P according to the relationship: $I_d V_d + I_q V_q = P$. Power is, thus, obtained on line 61. In block 62 are computed first $|I|^2 = I_d^2 + I_q^2$ from the values of $I_d$ and $I_q$ derived on lines 56', 57', from lines 56 and 57, respectively. Then, within block 62 is computed the resistance R according to the relationship:

$$R \sim \frac{P - P_{ri}}{|I|^2} - r$$

The value of R so derived on line 63, is inputted into block 64 which also receives the signal of line 22, a signal representative of the frequency. The load angle is computed within block 64 according to the formula:

$$\delta_{FB} \sim \tfrac{1}{2} \arcsin^{-1}\left(\frac{R}{2\pi f \cdot K_2}\right)$$

whereby the load angle $\delta_{FB}$ appears on line 28 at the output of the overall processor PRC.

Figure 5B:
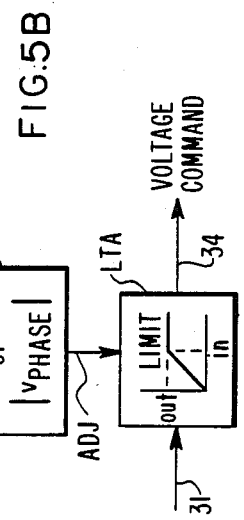
FIG. 5B is a block diagram illustrating the two separate functions embodied in the voltage command limiter of FIG. 3.

Considering FIG. 5B, the voltage command limiter LMT2 of FIG. 3 is decomposed into a computational block VCC and a limiter proper LTA for limiting the voltage command of line 34 to a value in relation to the V phase voltage between D and E in FIG. 4 when operating at maximum air gap flux (V/f). Referring to FIG. 4, the operation of blocks of FIG. 5B can be explained, as follows:

$$V_1/f = \phi = \text{rated air gap flux,}$$

where $V_1$ is the air gap voltage, namely between F and G ($V_1 = fx\phi$).

$$I_1 = \frac{V_1 \angle 0°}{r_i}$$

and $$I_2 = \frac{V_1 \angle 0°}{R + jX}$$

where $jX = jK_1\omega \cos(2\delta)$ and $R = K_s\omega \sin(2\delta)$. $\overline{I}$ phase $= \overline{I_1} + \overline{I_2}$, and $V_2$, the stator winding voltage (between D and F) is: $\overline{V_2} = \overline{I}$ phase $(r + jXl)$. From $\overline{V_1}$ and $\overline{V_2}$ block VCC of FIG. 5B calculates the V phase voltage: $V$ phase $= |\overline{V_1} + \overline{V_2}|$. In othe words, from the inputs $\delta_{FB}$ on line 32 and f on line 33, block VCC does a calculation backward to what the V phase should such as not to exceed the required rated flux limit. This condition within block LTA being satisfied under the control on line ADJ. Block LMT2 provides a voltage command on line 34 which is equal to the absolute value of the speed error applied on line 31, except when line 31 exceeds the limit defined by line ADJ. In this event, the voltage command on line 34 is the voltage limit value defined by line ADJ.

Through this effect, it is possible to fix by line 26 a load angle reference $\delta_R$ onto line 27 so as to maximize the efficiency, and still adjust the torque by varying the excitation in response to a speed error, thereby allowing to increase, or decrease, the field according to the magnitude and sign of the error (line 29). At the same time, the voltage command limiter LMT2 insures that upon a stepped change of speed, no overexcitation of the motor will occur.

The computation can also be carried out digitally, in which case a microprocessor will be used. On FIG. 3, the computation is symbolized by a processor PRC which responds to the values of V on line 3, of I on line 13 and of the frequency (f) on line 22. The feedback load angle $\delta_{FB}$ is outputted on line 28.

FIG. 3 is like in FIG. 1 in that the frequency control signal is applied from junction J2 into the VCO which by line 1 controls the frequency of the inverter AVI. A voltage control loop, from line 3 via a comparator CMP1, includes line 5 inputted into scaling circuit SC1 to provide voltage control on line 2 to the inverter.

The circuit of FIG. 3 differs from the circuit of FIG. 1, not only by the computation of the load angle $\delta_{FB}$ by processor PRC, but also in the following respects:

The motor is operated under a chosen most efficient value $\delta_R$ applied on line 27. This operation results from a speed error derived on line 24 from comparator CMP4 which compares the reference speed on line 21 to the actual speed derived on line 23, just like the signal of line 22 to the processor PRC, namely from junction J2 at the input of the VCO. The error in speed on line 24 is fed into a scaling circuit SC4 which applies the proper signal to a limiter LMT1. The limit has a characteristic determined by a setting signal on line 26. This setting signal is generally set for operation at 45° or above, preferably 55° and even 60°, which are typically the most efficient values for the operative load angle of the reluctance motor. Having so established the optimum condition of operation, limiter LMT1 will establish on line 27 such desired operative condition for $\delta_R$. Limiter LMT1 operates for either direction, as seen from the error of line 24. However, if desired, by line 26 another level for $\delta_R$ on line 27 can be established. The reference signal being so determined on line 27, the feedback signal $\delta_{FB}$ of line 28 is received for comparison with the signal of line 27 within comparator CMP3. This means that any error on line 19, modified by a proper scaling circuit SC3, will cause on line 20 the frequency of the VCO to be modified until the error becomes very small, namely, when the actual load angle $\delta_{FB}$ has been adjusted to meet the demand of line 27.

It is also observed that, in so doing, the system adjusts the motor excitation so as to maintain the desired load angle as the speed and/or the load vary. This was not present in the prior art circuit of FIG. 1. A voltage command limiter LMT2 responds to the desired voltage on line 31, to the actual load angle on line 32 and to the actual frequency on line 33 so as to maintain at the output on line 34 a voltage command which is equal to the signal of line 31 (up to a limiting level defined by line ADJ as in FIG. 5B). Such limited voltage establishes on line 34 the reference voltage for the adjustable voltage inverter. This is carried out by the voltage control loop generating with comparator CMP1 an error on line 5. Scaling circuit SC1 will generate on line 2 a command to change the voltage V outputted by the inverter so as to eventually change $\delta_{FB}$ as a result of line 3 onto CMP1 and of $\delta_{FB}$ derived from the processor PRC and applied by lines 28 and 32 to limiter LMT2. Finally, the speed signal from line 21 and the resulting error on line 24 are operating on a voltage loop by line 29 to a scaling circuit SC5, then, by line 30 into an absolute value circuit AV, thereby providing on line 31 a voltage command input signal for the voltage command limiter LMT2.

The speed error of the speed control loop (SCL) provides the reference inputs for the inner load angle control loop on line 27 and for the motor voltage control loop on line 34. For the load angle control loop, the speed error is amplified and passed through the limiter circuit LMT1 which has a bi-stable output characteristic.

Positive and negative errors (depending upon motoring, or braking) which determine the sign of the error 24 by the input of line 21) regardless of magnitude, provide, respectively, a predetermined fixed level (positive, or negative) load angle reference (line 27) for the load angle control loop LACL. The magnitude of the load angle reference is selected by line 26 and the resulting characteristic of limiter LMT1 (having a positive limit for motoring, a negative limit for braking) maximizes either the motor torque, the efficiency, the power factor, or the power factor-efficiency product. The load angle control loop behaves like a phase-locked control loop which compares the load angle reference $\delta_R$ with the motor load angle $\delta_{FB}$ as computed and fedback. The load angle error on line 19 is amplified, then controls the frequency of the VCO which, in turn, determines the motor excitation frequency, thereby (by way of the speed and voltage control loops) adjusting the motor load angle.

In the speed control loop, the speed error (lines 24, 29) is amplified. Its absolute value is taken (AV) and passed through the voltage limiter (LMT2), the voltage command limit of which (line 34) varies as a function of the motor excitation frequency (line 33) and the motor load angle $\delta_{FB}$ (line 28), thereby providing voltage command on line 34 which is equal to the absolute value of speed error applied on line 31, except when line 31 exceeds the limit defined by line ADJ. In this event, the voltage command on line 34 is the voltage limit value (defined by ADJ in FIG. 5B). The resulting voltage command (line 34) is applied to the voltage control loop VCL. It is compared (CMP1) with the motor terminal voltage (V) as sensed and derived from line 3. The error voltage is amplified (SC1) and used to control the magnitude of the inverter output voltage by line 2. The voltage command limiter LMT2 embodies a function such that the ratio V/F at the input of the motor never exceeds a rated value. Since the motor is controlled to operate at a fixed magnitude of load angle (line 27), independently of the load, the speed control loop SCL normally adjusts the ratio V/F for any frequency to a value required to supply the motor load. The motor operates at rated V/F, only when it is supplying maximum operating torque. For lower torques, the motor operates at a lower appropriate V/F level. This control scheme differs from conventional control schemes in which the motor operates at rated V/F at all times and the motor load angle adjusts itself to match the load torque. The invention provides a more efficient operation for the motor and a more efficient system overall. Provision is made also of adding to such a system means for detecting whether the motor is synchronized, or not, so as to modify the system accordingly, namely by changing the setting of line 26.

From a comparison between the control system of FIG. 1 (prior art) and the control system of FIG. 3 (invention), it appears that the motor with the prior art approach can run at maximum efficiency at certain loads and certain frequencies, but not at all loads and all frequencies. One control loop is missing. The motor operates at a certain load and that load determines the frequency. In contrast, with the present invention it is possible to choose the load angle, namely the most suitable one for maximizing the efficiency, *and* to choose the frequency independently of the load.

The operation of the reluctance motor control system according to the present invention can be illustratively explained by reference to FIG. 3 as follows:

Starting from an initial speed reference on line 21, for which the system is at equilibrium, the speed is changed by a sizable amount, for instance by an increase causing an error to appear on line 24. It is recalled at this point that, by line 26, a reference load angle is imposed on line 27 which is the most efficient operative load angle desired for the motor. If the afore-stated error caused by the change on line 21 changes the sign of the error on line 24, there will also be a change of sign in the reference angle $\delta_R$ of line 27 as shown by the characteristic of FIG. 3.

Considering again the error in speed appearing on line 24, this error is controlling the voltage via line 29, circuits SC5 and AV, line 31, limiter LMT2 (the function of which will be considered separately hereinafter), line 34 and the voltage feedback loop due to the intervening comparator CMP1. Therefore, the voltage of the inverter is caused to be increased. When the voltage V increases, the motor being under a given torque, or load, the feedback load angle $\delta_{FB}$, calculated by the processor, will decrease. As a result, an error will appear on line 19, which is a discrepancy from the imposed ideal reference load angle of line 27. Therefore, on line 20 the VCO will be controlled so as to increase the frequency. This will lead to changing the speed of the motor, thereby reducing the speed error of line 24, which in turn will reduce the voltage V, the latter eventually reaching a level as needed to match the existing torque, or load, condition on the motor. At the same time, an operative load angle $\delta_{FB}$ is achieved which matches the imposed value of $\delta_R$ on line 27, except for a small error which appears on line 19 and is scaled by SC3 to generate the frequency command appearing on line 20. According to the present invention, control automatically adjusts the voltage signal controlling the motor voltage so as to be what is required to generate the necessary load torque, while maintaining the motor load angle $\delta_{FB}$ virtually equal to the optimum selected load angle $\delta_R$. Thus, according to the invention, the motor load angle is controlled to be a predetermined optimum, selected to be positive in the motoring, to be negative in the braking mode of operation. The motor voltage is at the same time adjusted to match the required load torque. Therefore, the motor operates at rated maximum air gap flux (V/f) only when operating at maximum load torque. For lower torque loads, the motor air gap flux (V/f) is appropriately less than rated. Limiter LMT2 insures, as an additional safeguard, that the V/f ratio of the motor does not exceed the rated ratio of V/f under any operating condition. In contrast, conventional schemes operate the motor at constant air gap flux (V/f) and at a motor load angle that varies as a function of motor torque. The invention offers the advantage that the motor always operates at an optimum selected load angle independently of load and speed.

Figure 6:
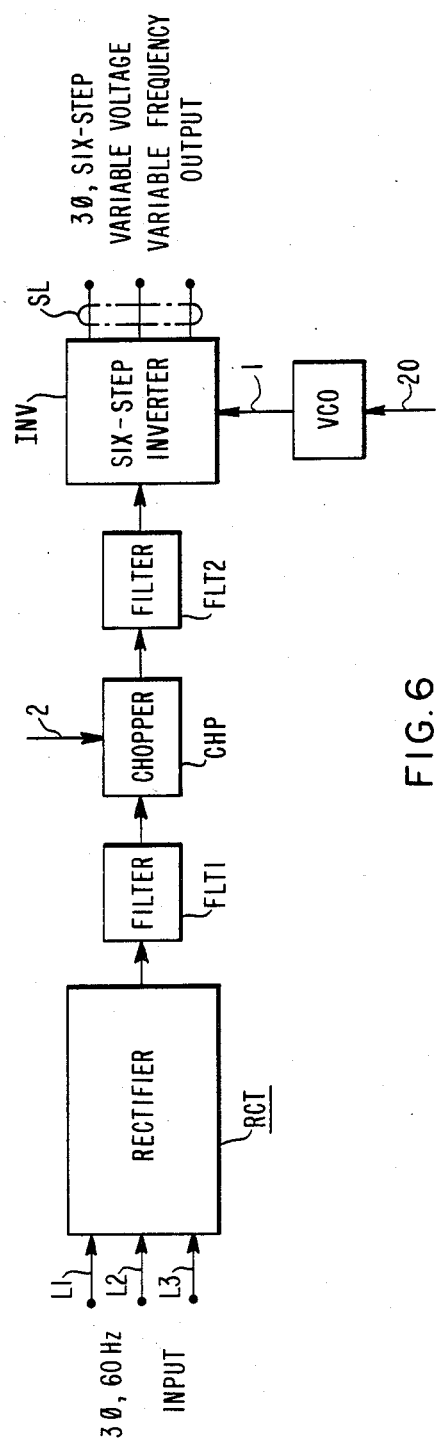
FIG. 6 shows illustratively an AVI system as applicable to the system of FIG. 3.

The implementation of the adjustable voltage inverter AVI drive is illustrated in block diagram form by FIG. 6. The 3-phase, 60 hertz source is inputted on line $L_1$, $L_2$, $L_3$ into a rectifier circuit RCT. The output is filtered at FLT1, then, inputted into a chopper CHP. The chopper is controlled from line 2 which belongs to the feedback voltage control loop of FIG. 3. The output of the chopper is filtered at FLT2. The resulting filtered voltage is used to provide an adjustable DC voltage for the inverter, namely a six-step inverter INV. The VCO of FIG. 3 controls by line 1 the firing instants of the switches of the inverter for frequency control, as generally known.

An alternative means for obtaining an adjustable DC voltage for the inverter INV is to replace rectifier circuit RCT, filter FLT1, and chopper CHP by a controlled thyristor converter. Also, the chopper CHP, filter FLT2, and the six-step inverter could be replaced by a PWM inverter where an invert system is used an AVI inverter is generally preferred, because it typically provides greater voltage control flexibility over its entire output frequency range.

We claim:

1. In a reluctance motor control system for operating a reluctance motor under AC voltage with AC current at an operative frequency and under an operative load angle, including a voltage-source inverter controlled in frequency and voltage, the combination of:
   means for sensing the current supplied by the inverter to the motor for deriving a current representative signal;
   means for sensing the voltage supplied by the inverter to the motor for deriving a voltage representative signal;
   calculating means responsive to said voltage and current representative signals and to a frequency representative signal for generating a signal representative of the operative load angle of the motor;

load angle control loop means responsive to said operative load angle representative signal and to a load angle reference signal for controlling the inverter frequency in accordance with an error therebetween;

speed/frequency control loop means responsive to said frequency representative signal and to a speed reference signal for generating a voltage command signal;

voltage control loop means responsive to said voltage command signal and operative on said inverter for controlling the voltage thereof in response to said voltage command signal and in relation to said speed reference signal;

whereby the operative load angle of the motor is automatically adjusted to a value substantially equal to said load angle reference signal, under said voltage control loop means while controlling the reluctance motor to substantially match the speed reference signal.

2. The control system of claim 1 with said load angle frequency control loop means being operative on said inverter through voltage-controlled-oscillator means.

3. The control system of claim 1 with bi-stable limiter means being provided for establishing said load angle reference signal as a function of a predetermined load angle setting signal, the sign of said load angle reference signal being determined by said limiter means in accordance with said frequency and speed reference representative signals.

4. The control system of claim 3 with said predetermined load setting establishing a desired load angle in the range of 45° to 60°, whereby the reluctance motor operates at maximum efficiency in that range.

5. The control system of claim 4 with said limiter means having a positive and a negative mode each corresponding to one sign of the difference between said frequency and speed reference representative signals for providing said load angle reference signal with a positive sign when in the positive mode and a negative sign when in the negative mode; said positive and negative modes of operation corresponding to motoring and braking operation of the motor, respectively.

6. The control system of claim 1 with said voltage control loop means including voltage command limiter means operative in relation to said operative frequency and to said load angle signals, so as to prevent the voltage-to-frequency ratio from exceeding the motor rated voltage-to-frequency ratio.

7. The control system of claim 1 with said calculating means including:

first means responsive to said voltage sensing means for deriving a direct phase voltage Vd and a quadrature phase voltage Vq representative signal;

second means responsive to said current sensing means for deriving a direct phase current Id and a quadrature phase current Iq representative signal;

means responsive to said first and second means for deriving a signal representative of the power $P = IdVd + IqVq$;

means responsive to said power representative signal for computing $$R \sim \frac{P - P_{ri}}{|I|^2} - r,$$

where $r_i$ is the equivalent phase resistance of the motor representing iron, friction and windage losses; where r is the phase winding resistances of the motor; I the phase current where $P_{ri}$ is the losses in the motor core due to friction and windage, thereby deriving a signal representative of R, the motor resistance; and means responsive to said frequency representative signal and to said R representative signal for computing $\delta_{FB}$ the load angle, according to the relationship:

$$\delta_{FB} = \tfrac{1}{2} \text{arcsine} \left( \frac{R}{2\pi f \cdot K_2} \right)$$

* * * * *